J. C. WELLS.
EYEGLASSES AND SPECTACLES.
APPLICATION FILED AUG. 29, 1911.
1,046,129.
Patented Dec. 3, 1912.
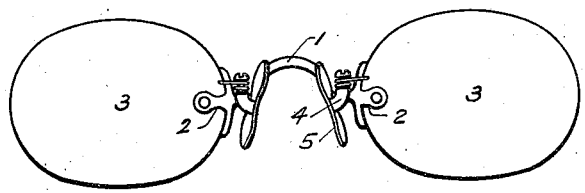
FIG. I
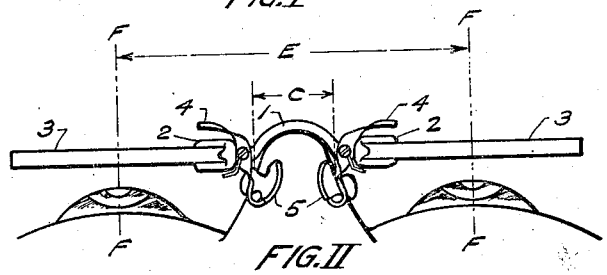
FIG. II
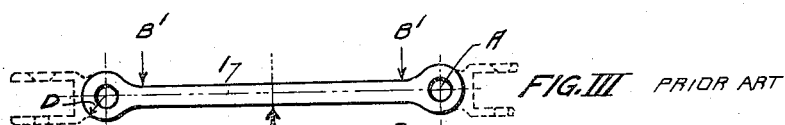
FIG. III   PRIOR ART
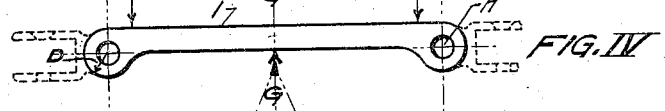
FIG. IV
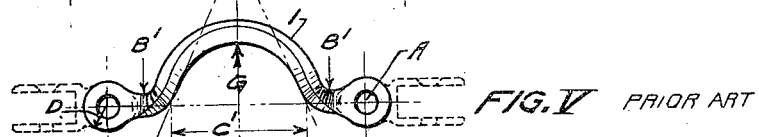
FIG. V   PRIOR ART
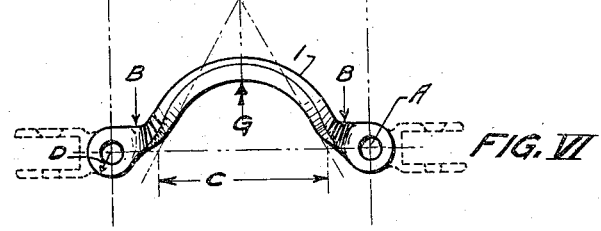
FIG. VI
WITNESSES:
Reginald H. Waters.
Paul S. Trueman.
INVENTOR
JOEL C. WELLS
BY Harry H. Styll
ATTORNEY

UNITED STATES PATENT OFFICE.

JOEL C. WELLS, OF SOUTHBRIDGE, MASSACHUSETTS.

EYEGLASSES AND SPECTACLES.

1,046,129.   Specification of Letters Patent.   Patented Dec. 3, 1912.

Application filed August 29, 1911. Serial No. 646,593.

*To all whom it may concern:*

Be it known that I, JOEL C. WELLS, a citizen of the United States, residing at Southbridge, in the county of Worcester and State of Massachusetts, have invented certain new and useful Improvements in Eyeglasses and Spectacles, of which the following is a specification.

My invention relates to bridges for eyeglasses and spectacles and particularly to that form of eyeglass having nose clamp levers pivoted adjacent the opposite ends of the bridge, but it is also applicable to other forms of bridges having widened ends in way of their attachment to the lens attaching means.

The principal object of my invention is to provide an improved bridge in which the nose curve or arch may be started near the inner edge of the lenses, to reduce to a minimum the space between the lens and the point where the bridge leaves the nose, to accommodate wearers having a wide nose space and a narrow pupilary distance.

My invention comprises a blank for a bridge wherein the enlarged ends which form the pivot bearings for the nose clamp levers are disposed to one side of the nose portion of the bridge in order to provide an initial bending point for the nose portion lying at a minimum distance from the path of the nose clamp lever, that is to say, the distance between the initial bending point of the arched portion and the pivotal point of the nose clamp lever is a minimum.

With these and other objects in view, the invention consists in the novel construction and arrangement of parts hereinafter described, delineated in the drawings and claimed, it being understood that changes properly falling within the scope of what is claimed may be made without departing from the spirit of my invention.

Similar numerals of reference are employed to denote corresponding parts throughout the several figures of the drawings.

In the accompanying drawings: Figure I represents a perspective view of a pair of eyeglasses embodying my invention. Fig. II represents a top view of Fig. I in place on the wearer's nose. Fig. III represents the usual or old style of an unbent blank for forming a bridge, the lens connecting elements being indicated by dotted lines. Fig. IV represents my present invention in the form of an unbent blank for forming a bridge, the lens connecting elements being indicated by dotted lines. Fig. V represents the usual or old style of bridge blank bent to finished form and ready for attachment to the lens connecting elements, which are indicated by dotted lines. Fig. VI represents my present invention bent to finished form and ready for attachment to the lens connecting elements, which are indicated by dotted lines.

The term "wide base" as used in the specification will be understood by reference to Figs. II, V, and VI, this term being applied in the optical sense to that portion of the bridge which is occupied by the wearer's nose and lies between the inner or concave sides of the bridge projected to a horizontal line drawn through the center of the unbent ends of the bridge blank as indicated by C and C'. The term "pupilary distance" will be understood by reference to Fig. II. This is the distance between the pupils of the wearer's eyes. This dimension measured between lens and lens is indicated at E. The center of the wearer's eyes should be coincident with the optical centers of the lenses in order to secure the optical advantages of the prescriptions which have been ground on the lenses to suit the specific case.

Referring specifically to the drawings: A rigid bridge 1 is attached at its ends to lens attaching members 2 which are employed to hold lenses 3 in the usual manner. Pivoted horizontally on the widened ends of the bridge 1 are nose clamp levers 4 carrying on their inner ends nose clips 5 in the usual well known manner. The ends of the bridge 1 are flattened and widened to a radius D and drilled to dimension A to receive a fulcrum member on which the nose clamp lever works. The points B indicated by arrows are the holding points of the tool on the blank of my invention, around which the metal of the blank is bent when pressure of the bending member is exerted on the center of the bridge, as indicated by arrows at G, the point B' being the corresponding point on a blank of the customary or old style. The dimension C in Fig. VI and C' in Fig. V is known as the base dimension and as previously explained, is the space occupied by the wearer's nose projected on a line drawn through the ends of the unbent bridge member. The dimension E is known as the pupilary distance, and as described above, represents the distance between the pupils of the wearer's eyes. In Fig. II the pupilary distance E is shown in its ideal condition with relation to the center of the wearer's eyes, that is to say, when the center of the eye is coincident with the optical center of the lens, as represented by the vertical lines F F which intersect the two centers.

The location of the point B is the essential feature of my invention and it will be noted by reference to Fig. IV that I have taken a blank in which the widened ends are disposed to one side of the bridge portion proper, the object being to locate the point B which is the initial bending point of the bridge at the minimum longitudinal distance from the pivot of the nose clamp lever, the point B being located to clear the sweep of the nose clamp lever about its bearings.

Reference to Fig. VI will show a bridge involving my invention after it has been bent, while Fig. V shows the usual or old style bridge after bending, and it will be noted that in the two bridges the distance between the pivot of the nose clamp lever and the point B is considerably less than that between the pivot of the nose clamp lever and the point B'. This space between the pivot of the nose clamp lever and the initial bending point is waste space in so far as the physiognomy of the wearer is concerned, and in cases where the wearer has a very wide nose and a very narrow pupilary distance it is of the first importance to reduce this distance to a minimum, and it is to accomplish this purpose that I have designed my blank so as to throw the initial bending point B at a minimum distance from the center of the widened ends of the bridge, as explained.

In the preferred method of making a bridge embodying my invention, the blank is first produced in the form illustrated in Fig. IV; the lens attaching elements 2 are then secured to the bridge in a line substantially parallel with the longitudinal center line of the blank, as shown in dotted lines in Fig. IV. The blank is then bent to form the arch for the nose, the lens holding elements being held in their longitudinal position. The flattened ends of the bridge are then drilled at A to form the pivots for the nose clamp levers. The lenses and the nose clamp levers are next put in place in the usual well known manner. If preferred, however, the lens attaching elements need not be secured to the bridge before the arch is bent, but they may be suitably fastened thereto after this operation has been performed, and the widened ends of the bridge may be provided with posts instead of eyes to form the pivot for the nose clip lever. This specific type of bridge is particularly applicable to an eyeglass having pivoted nose clamp levers known as fingerpiece eyeglasses, in which the lever is fulcrumed on the ends of the bridge, and it is, therefore, necessary that the bend of the bridge be clear of the area covered by the lever in its pivotal motion in order that the action of the lever may not be restricted.

By comparing Fig. IV, which shows my improved form of blank, with Fig. III, showing the usual or old style of blank, the advantages of the former to lend itself to abrupt bending in the direction of the arrow at the center of the bridge, will be readily seen. In Fig. IV, which shows the present form of invention, it will be noted that the blank is of a shape offering a peculiar initial advantage to bending, as the point of applying the bending tool at B can be located much nearer to the end of the blank than can the corresponding point B' in Fig. III. Consequently the waste space between the curve of the bridge and the pivot of the nose clamp lever is reduced to a minimum, allowing the lenses to be brought in nearer to accommodate persons having narrow pupilary distances.

To illustrate the peculiar advantages of a wide base bridge having a narrow distance between the initial bending point and the center of the nose clamp pivot, attention is invited to Fig. II, where the invention is illustrated in place on the wearer's nose, it being assumed for purposes of illustration that the wearer's nose is unusually wide and his pupilary distance unusually narrow. In this case, if the usual old style bridge had been used, that is, a bridge made from a blank as shown in Fig. III, and bent as in Fig. V, it is apparent that to have the curve of the bridge wide enough to accommodate the nose, the distance between the optical centers of the lenses would have to be increased to such an extent as to throw these centers of the lenses farther apart than shown. They, therefore, would not correspond with the centers of the pupils of the wearer's eyes. The wearer thus would lose the optical advantages of his prescription; that is, the lenses would not be correct, from which it is apparent that it is of the first importance to have the centers of the lenses coincide with the centers of the wearer's pupils, or in other words, if the distance between the centers of the wearer's eyes does not correspond with the centers of his lenses, there will be a prescriptive defect, which is injurious, and it is to overcome this defect in cases where the patient has a very wide nose and a very narrow pupilary distance that I have designed the peculiar formation of bridge shown in my invention. It will be noted in the majority of cases involving a narrow pupilary distance that by reducing the distance between the lens edge and the bend of the arch of the bridge, as in my invention, the pupilary distance may be accommodated without altering the shape and size of standard lenses, thereby obviating special grinding and consequent expense.

I have described the preferred form of my invention, but it is possible for modifications to be made which do not depart from the spirit thereof, and consequently I do not desire to be limited to the exact details shown and described.

Having thus described my invention, the following is what I claim as new therein and desire to secure by Letters Patent:

1. A lens mounting comprising a bridge member terminating at each end in a rearwardly offset lug, said lugs being substantially semi-circular in form and so disposed that the curvature of their inner sides is substantially a continuation of the curve of the bridge, and lens clips secured to the extremities of the lugs, said clips being disposed in alinement with each other and with the medial portions of the lugs.

2. A bridge, comprising a central arch portion terminating at each end in a rearwardly offset seat having its inner face disposed substantially tangential to the curvature of the arch of the bridge.

3. In an eyeglass mounting, the combination with a bridge having a central arched portion terminating at each end in a seat projecting rearwardly from the arched portion with its inner face substantially tangential to the curvature of the arch extended, of a lens clip attached to the seat and disposed with its medial line rearwardly of the terminus of the arched portion of the bridge.

In testimony whereof I affix my signature in presence of two witnesses.

JOEL C. WELLS.

Witnesses:
REGINALD H. WATERS,
PAUL T. TRUEMAN.

---

Copies of this patent may be obtained for five cents each, by addressing the "Commissioner of Patents, Washington, D. C."